US006761293B2

(12) United States Patent
Vasseur

(10) Patent No.: US 6,761,293 B2
(45) Date of Patent: Jul. 13, 2004

(54) SPARE TIRE SUPPORT FOR AN AUTOMOBILE

(75) Inventor: Patrice Vasseur, Paris (FR)

(73) Assignee: RENAULT, Boulogne Billancourt (FR)

(*) Notice: Subject to any disclaimer, the term of this patent is extended or adjusted under 35 U.S.C. 154(b) by 0 days.

(21) Appl. No.: 09/802,856

(22) Filed: Mar. 12, 2001

(65) Prior Publication Data

US 2002/0050500 A1 May 2, 2002

(30) Foreign Application Priority Data

Mar. 10, 2000 (FR) .............................. 00 03101

(51) Int. Cl.[7] .............................................. B62D 43/00
(52) U.S. Cl. ............................. 224/42.21; 224/42.13; 224/42.14; 224/42.2; 224/42.24; 296/37.1; 296/37.2; 414/463
(58) Field of Search ......................... 224/42.21, 42.24, 224/42.25, 42.2, 42.13, 42.14; 296/37.1, 37.2, 37.3; 414/463

(56) References Cited

U.S. PATENT DOCUMENTS

| 1,850,826 A | | 3/1932 | Burney | |
|---|---|---|---|---|
| 2,701,670 A | * | 2/1955 | Hutchinson | 224/403 |
| 2,805,807 A | * | 9/1957 | Slack | 224/42.21 |
| 4,771,926 A | * | 9/1988 | Anderson et al. | 224/42.13 |
| 5,183,192 A | * | 2/1993 | Mrozowski et al. | 224/42.21 |
| 5,186,371 A | * | 2/1993 | Jozefczak et al. | 224/42.21 |
| 5,427,287 A | * | 6/1995 | Harrison | 224/42.21 |
| 5,979,115 A | * | 11/1999 | Szerdahelyi et al. | 296/146.7 |

FOREIGN PATENT DOCUMENTS

JP 08-156598 6/1996

* cited by examiner

Primary Examiner—Gregory Vidovich
Assistant Examiner—Maerena W. Brevard
(74) Attorney, Agent, or Firm—Oblon, Spivak, McClelland, Maier & Neustadt, P.C.

(57) ABSTRACT

A support for a spare tire for the tailgate of an automobile. The support is configured to receive an anchoring disk of the spare tire and is positioned in the thickness of the tailgate between an internal lining panel turned toward the passenger compartment of the vehicle, and an external body panel, so that the spare tire is flush with the extension of the external panel. The support is carried by an internal tubular frame of the tailgate that carries the hinge and locking mechanisms of the tailgate on the body shell structure, and to which the internal lining and external body panels are anchored.

20 Claims, 6 Drawing Sheets

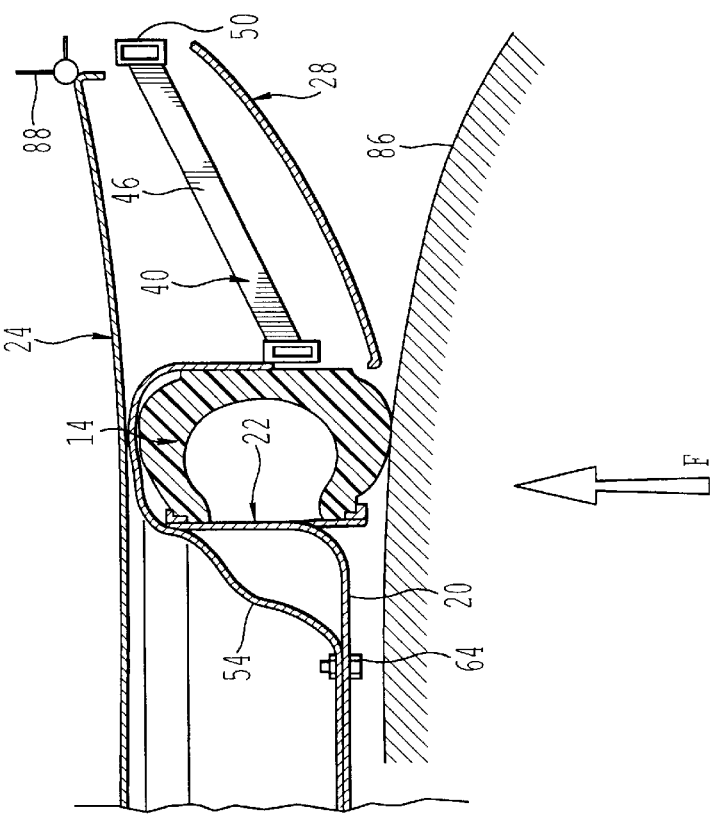
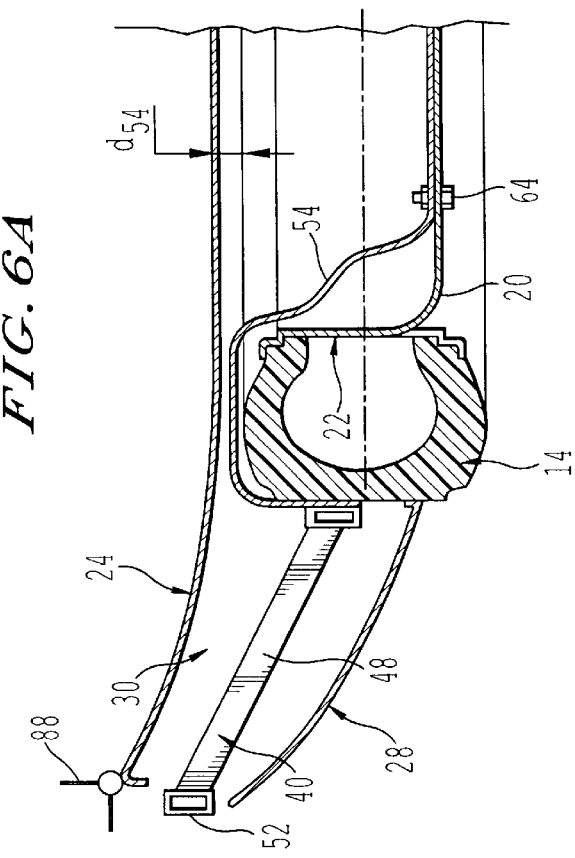
FIG. 6A
FIG. 6B

SPARE TIRE SUPPORT FOR AN AUTOMOBILE

CROSS REFERENCE TO RELATED APPLICATIONS

The present invention claims priority to French Application No. 00-03101, filed on Mar. 10, 2000 which is hereby incorporated by reference in its entirety.

BACKGROUND OF THE INVENTION

1. Field of the Invention

The present invention relates generally to a spare tire support for an automobile.

2. Discussion of the Background

Many examples of spare tire supports are known. Such supports are carried by tailgates like those encountered on recreational "all terrain" or "4×4" vehicles and may, for example, be positioned in the thickness of the tailgate so that the spare tire is flush with the extension of the external panel.

Most layouts involve a tailgate formed by an internal lining panel and an external body panel that are joined at their edges, where at least one of the panels comprises a recess of a size comparable to the size of the spare tire that comprises the support. In this manner, the spare tire is received roughly in the thickness of the tailgate. In this type of layout, the interior lining and exterior body panels are generally cemented if these elements are made of a synthetic material or welded, it these elements are made of sheet metal. In both cases, an impact suffered by the rear of the vehicle involving the tailgate destroys it and, by the same token, distorts the spare tire support.

This configuration is particularly disadvantageous for the owner of a vehicle equipped with this type of tailgate, for replacing this type of tailgate is particularly expensive.

SUMMARY OF THE INVENTION

To eliminate the above described disadvantage, the present invention provides a spare tire support that is attached neither to the internal lining panel nor to the external body panel so that it constitutes an element that is capable of absorbing a rear impact to protect the internal lining and external body panels so that, even if they are involved, the internal lining and external body panels can be replaced independent of a structural element of the tailgate that carries the support.

Accordingly, the present invention advantageously provides a spare tire support for an automobile, and more specifically, a spare tire support carried by the tailgate of an automobile that is configured to receive an anchoring disk of the spare tire and that is positioned roughly in the thickness of the tailgate between an internal lining panel, turned toward the passenger compartment of the vehicle and an external body panel.

To this end, the invention proposes a spare tire support where the support is carried by an internal frame of the tailgate that carries the hinge and locking mechanisms of the tailgate on the body structure and on which the internal lining and external body panels are anchored.

According to alternative features of the invention:

the spare tire support is less stiff than the frame that bears it so that the support can be distorted without distorting the frame of the tailgate when the vehicle suffers a rear impact;

the spare tire support is received in a central circular band of the frame that is roughly the same diameter as the tire and on either side of which are attached transversal arms, one of which carries the hinge mechanisms while the other one carries locking mechanisms for the tailgate;

the arms of the frame are each formed of slender tubes that are joined in the shape of a C, the free ends of the horizontal branches are welded to the central circular band, and the vertical branch carries the hinge mechanisms and the locking mechanisms respectively;

the spare tire support has the shape of a transversal member whose ends are attached to the inside edge of the central circular band according to the orientation of the arms, and whose convex central part, which is dished in order to be received in the rim of the spare tire, carries anchoring means for the spare tire disk;

the dished convex part of the support is turned toward the passenger compartment of the vehicle;

the internal panel comprises a circular access hatch that is at least equal in diameter to the spare tire in order to allow it to be changed and anchored from inside the vehicle;

the dished convex part of the support is turned toward the outside of the vehicle;

the internal panel comprises a circular access hatch that is roughly equal in diameter to the spare tire flange;

the external panel comprises at least one removable central part forming a cover for the spare tire;

the removable central part forming a cover for the spare tire is anchored to the back of the convex dished part of the support and is adjusted with an additional skin of the external body panel;

all the members of the tailgate are attached using screws to allow removal and replacement of the components of the tailgate independent of one another;

the spare tire support is positioned at a determined distance from the internal body panel so that the spare tire can recoil in determined fashion at the end of an impact, without distorting either the internal lining panel or the sill of the tailgate of the vehicle; and the support is H-shaped and its horizontal branch receives the disk of the spare tire and the free ends of the vertical branches are attached to transversal branches of a monoblock framework forming the frame of the tailgate.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 6 is a juxtaposition of views according to FIG. 5 representing, respectively from left to right, the tailgate before and after an impact suffered by the rear of the vehicle.

DESCRIPTION OF THE PREFERRED EMBODIMENTS

The present invention will now be described with reference to preferred embodiments that provide advantageous structures that address the problems identified by the inventors.

In the description that follows, identical reference figures designate identical parts or parts that have similar functions.

Figure 1:
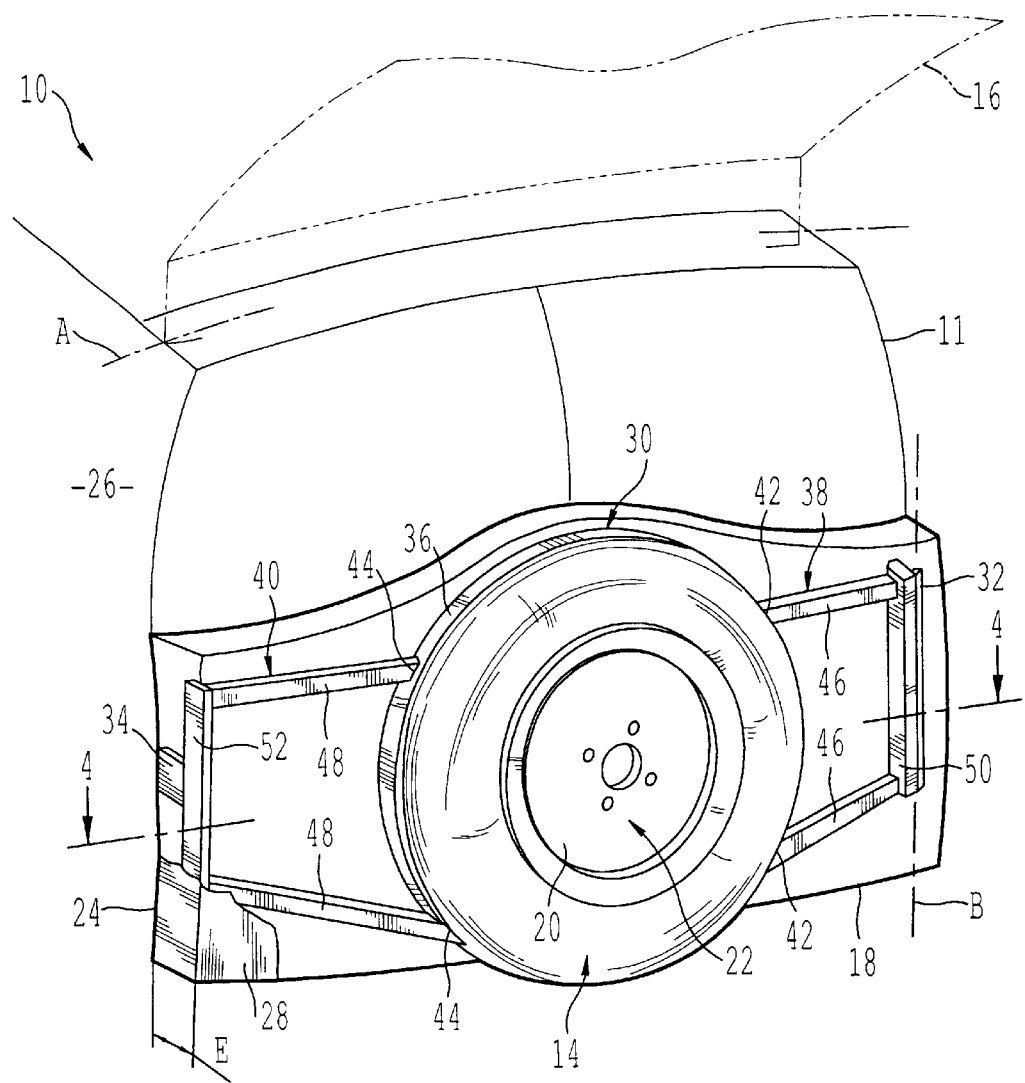
FIG. 1 is a perspective view of a rear of a vehicle comprising a tailgate equipped with a support according to the present invention.

FIG. 1 shows the rear of a vehicle (10) equipped with a tailgate (12) comprising a support for a spare tire (14) produced in accordance with the present invention.

The tailgate (12) includes two parts, more particularly an upper part (16) forming a rear hatch that is hinged with respect to a structure (11) of the body of the vehicle (10) around a transversal axis (A) and a lower part (18) forming a gate that is hinged with respect to the structure (11) of the body shell to the vehicle (10) around a vertical axis (B). In FIG. 1, axis (B) is located to the right of the vehicle (10), however, such an arrangement is not limiting for the invention. For example, the hinge axis (B) of the lower part (18) of the tailgate (12) could be placed on the left side of the vehicle (10). A tailgate (12) of this type is more particularly intended for a recreational "all terrain" or "4×4" vehicle.

The tailgate (12) support is configured to receive a central disk (20) of a rim (22) of the spare tire (14). The disk (20) makes it possible, for example, to anchor the spare tire (14) onto the support or onto an axle hub (not shown) of the vehicle. The support is positioned roughly in the thickness (E) of the tailgate (12) between an internal lining panel (24), facing toward the passenger compartment of the vehicle, and an external body panel (26), so that the spare tire (14) is flush with the extension of the external panel (28).

In accordance with the invention, the support is carried by an internal tailgate (12) frame (30) that carries the hinge mechanisms (32) and the locking mechanisms (34) of the tailgate (12) on the body shell structure (11) and on which are attached the internal lining panel (24) and the external body panel (26). The frame (30) may, more particularly, be tubular. The internal lining panel (24) and the external body panel (26) are, more particularly, anchored by screws to allow them to be removed and replaced, as will be described later. More specifically, the support is received in a central circular band (36) of the frame (30) that is roughly the same diameter as the tire (14) and on each side of which are fixed symmetrical transversal arms (38, 40) one of which carries the hinge mechanisms (32) while the other carries the locking mechanisms (34) of the tailgate (12).

The arms (38, 40) are not included in the circular band (36) but their opposite transversal ends are inclined roughly toward the front of the vehicle, in order to give a determined curvature to the internal lining panel (24) and the external body panel (26) attached to it. The arms (38,40) of the frame are each formed of slender tubes joined to form a "C." The respective free ends (42, 44) of the respective horizontal branches (46, 48) of the arms (38, 40) are welded to the central circular band (36) and the vertical branches (50, 52) of the arms, which form their opposite transversal extremities, carry respectively the hinge mechanisms (32) and the locking mechanisms (34) of the tailgate (12). Thus, for example, vertical branch (50) of arm (38) carries two vertically aligned hinges that form the hinge mechanisms (32) of the tailgate (12) and the vertical branch (52) of arm (40) carries a lock that forms the locking mechanism (34) of the tailgate (12).

The detail of the embodiment of the support will now be described in reference to FIGS. 2 to 6.

Figure 2:
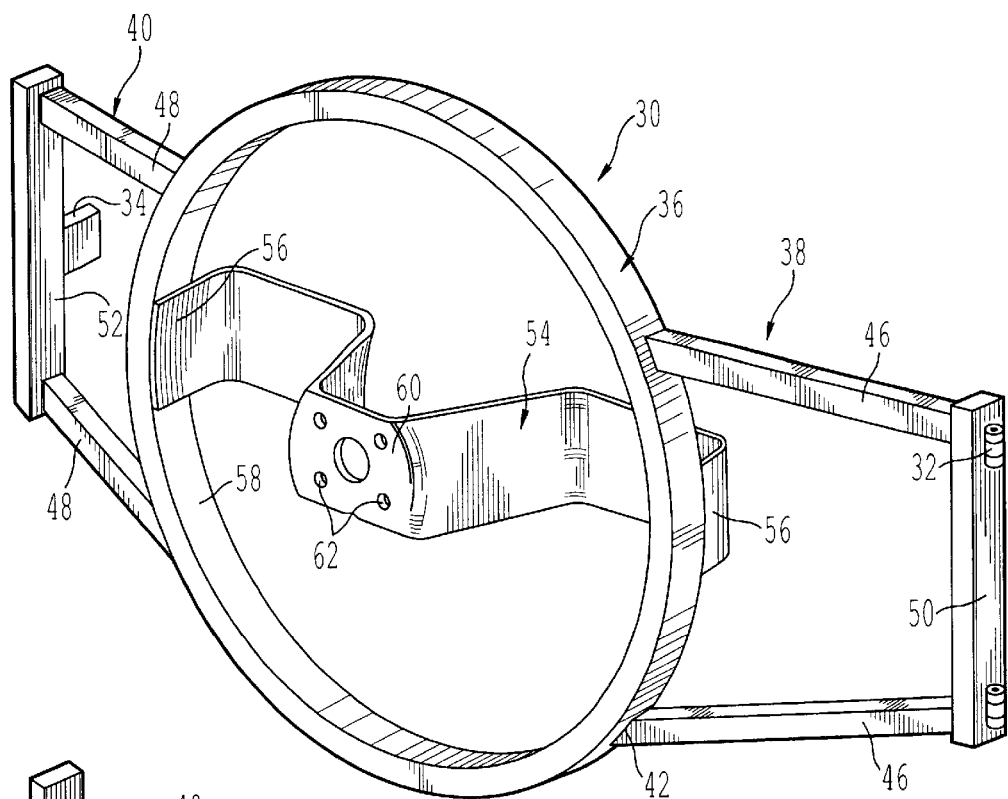
FIG. 2 is a perspective view of a frame of the tailgate comprising a bare support according to a first mode of embodiment of the invention.
Figure 3:
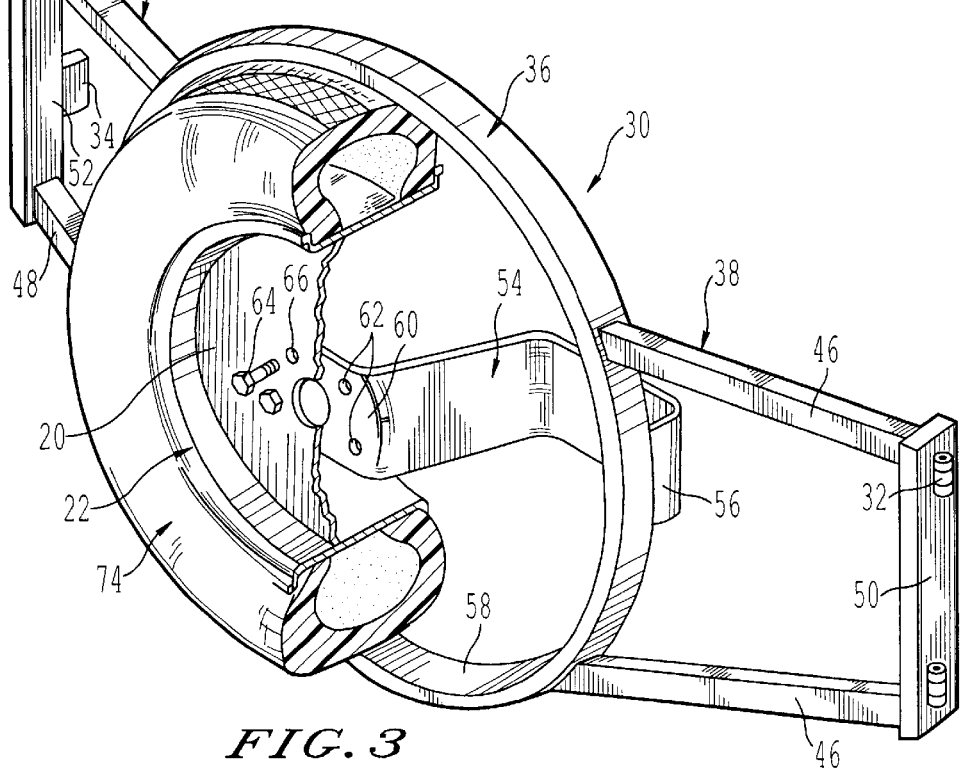
FIG. 3 is a perspective view of the frame of FIG. 2 comprising a support equipped with a partial view of a tire.

As shown in FIG. 2, the support (54) is shaped like a transversal member whose ends (56) are fixed, more particularly by welding, to the inside edge (56) of the central circular band (36) in the extension of the arms (38, 40) and whose convex central portion (60), which is dished in order to receive the rim (22) of the spare tire (14), carries the means for attaching the wheel disk (20) of the spare tire (14). For example, as illustrated more specifically in FIG. 3, the convex central portion (60) can have the shape of a plate that is positioned roughly in the plane of the disk (20) of the spare tire (14) and that comprises holes (62) configured to receive the anchoring screws (64) for the tire (14). Thus, the screws (64) pass through the holes (66) in the disk (20) of the spare tire (14), which are, more particularly, holes (66) intended to anchor the tire (14) to an axle (not shown) of the vehicle, then they are received in the holes (62) of the central portion (60). The screws (64) are more particularly anchored to the back of the convex central part (60) by nuts (not shown). As a variation (not shown), the holes (62) of the central part may comprise threading in order to receive the screws (64) directly.

This configuration is particularly advantageous, since it allows one to center the tire (14) with respect to the convex central part (60) and therefore with respect to the circular band (36).

Figure 5:
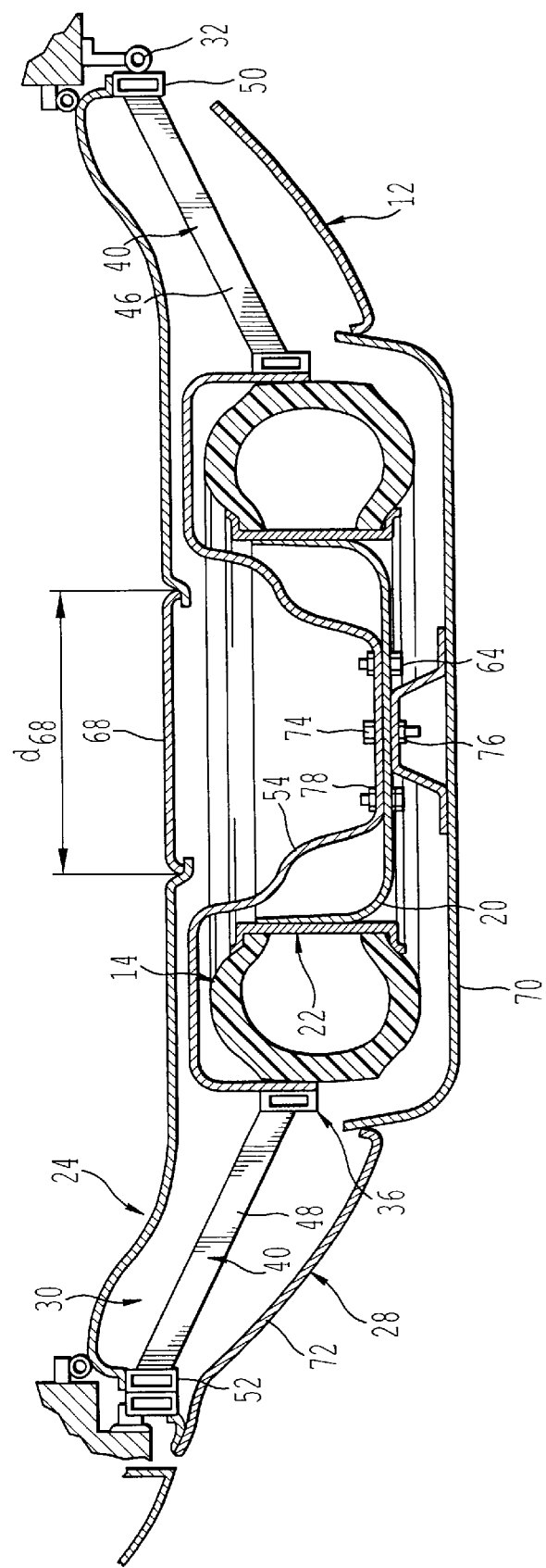
FIG. 5 is a cross-sectional view from a perspective similar to that of FIG. 4 of a tailgate that comprises the support produced according to the first mode of embodiment of the invention.

According to a first mode of embodiment, which is represented in FIGS. 2, 3, 5 and 6, the dished convex part (60) of the support is turned toward the outside of the vehicle, that is, toward the external body panel (28). In this configuration, as shown in FIG. 5, the internal lining panel (24) comprises a circular access hatch (68) that has a diameter ($d_{68}$) that is roughly equal to the diameter of the disk (20) of the spare tire (14). The access hatch (68) is fixed in removable fashion to the internal lining panel (24). It allows access to the back of the convex dished central part (60) of the support (54) to remove the tire (14). In particular, the external panel (28) is formed of at least one removable central part (70) that forms a cover for the spare tire (14) and of an additional skin (72) of the external body panel (28). The removable central part (70) forming a cover for the spare tire (14) is attached to the anchoring disk (20) of the spare tire (14) by a screw (74) that passes through the convex dished central part (54) and the disk (20) and that is received in a captive nut (76) that is an integral part of the removable central part. Advantageously, the removable central part (70) forming a cover for the spare tire (14) is configured to fit together with the additional skin (72) of the external panel (28). Thus, the access hatch (68) allows access from the inside of the vehicle to the anchoring screw (74) of the removable central part that thus provides effective protection against theft of the spare tire (14). Then, once the removable central part (70) forming the cover is removed, one has access from the outside to the screws (64) that cooperate with the nuts (78) that are an integral part of the support (54) to anchor the disk (20) of the tire (14) to the support (54).

As a variation (not shown), the convex dished central part (60) of the support (54) can comprise threaded holes to receive the screws (64) directly.

Once the access hatch (68) is open, this configuration also advantageously allows one to remove only the removable central part (70) forming a cover in order to check the pressure of the spare tire, for example, or to remove the spare tire (14) from the outside in case of a flat.

Figure 4:
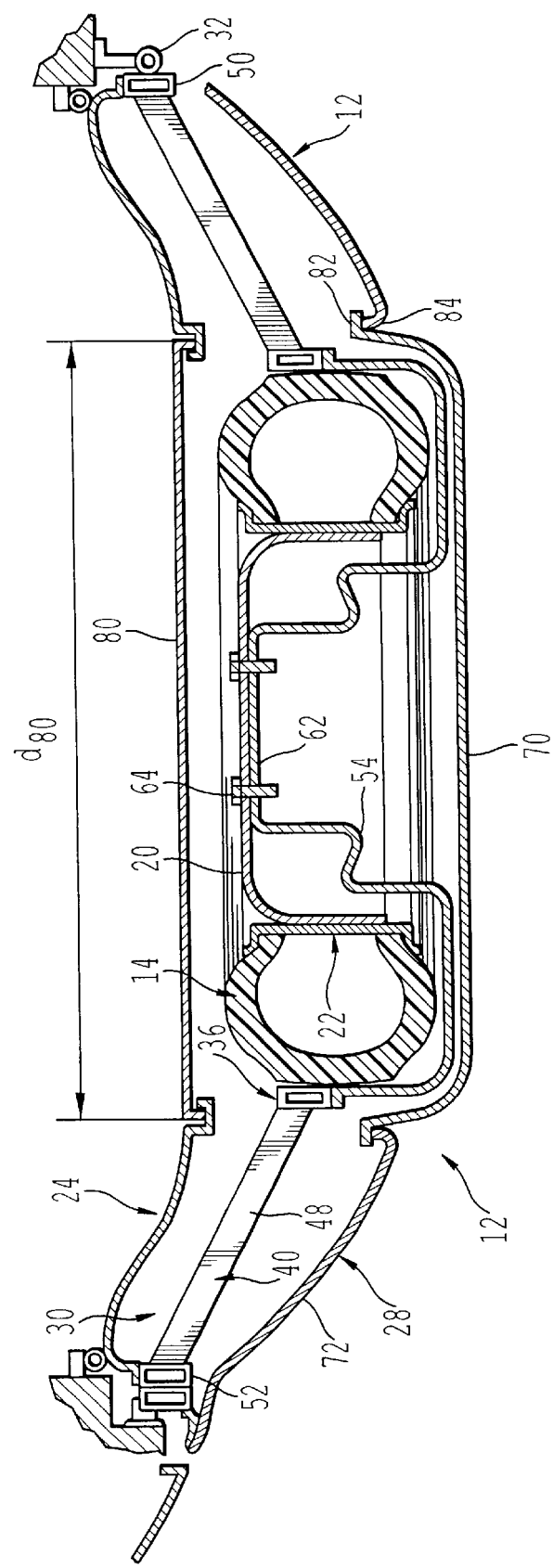
FIG. 4 is a cross-sectional view taken along line IV—IV of FIG. 1 of the tailgate that comprises the support produced according to a second mode of embodiment of the invention.

According to a second mode of embodiment, which is shown in FIG. 4, the convex dished part (60) of the support (54) is turned toward the passenger compartment of the vehicle, that is, toward the internal lining panel (24) of the tailgate (12). In this configuration, the internal panel (24) comprises a circular access hatch (80) that has a diameter ($d_{80}$) that is at least equal to the diameter of the spare tire (14), making it possible to load and anchor it when the tailgate (12) is open or from the passenger compartment of the vehicle when the tailgate (12) is closed.

In analogous fashion to the previous mode of embodiment, the external panel (28) is formed of a removable central part (70) forming a cover for the spare tire and an additional skin (72) of the external body panel (28). However, in this mode of embodiment, the removable central part (70) forming a cover for the spare tire (14) is attached directly to the additional skin (72) of the external body panel (28). For example, the removable central part (70) may comprise on its perimeter a peripheral collar (82) that is adhered, during mounting of the tailgate (12) onto an edge (84) of the opening of the additional skin (72).

As a variation, the removable central part (70) may have a determined flexibility that allows the insertion then the nesting of the collar (82) behind the edge (84) of the opening of the additional skin (72). This configuration allows removal of the removable central part (70).

In analogous fashion to the previous mode of embodiment, the access hatch (80) allows access directly to the anchoring screws (64) for the disk (20) of the tire (14) on the support (54), which, in this mode of embodiment, are received directly in the threaded holes (62) of the support (54).

As illustrated in FIG. 6, which concerns, more specifically, but in non-limiting fashion, the first mode of embodiment, the support (54) for the spare tire has less axial stiffness than the tubular frame (30) that carries it so that the support (54) can be distorted, without distorting the frame (30) of the tailgate when the vehicle suffers a rear impact.

On the left side of FIG. 6, the support (54) for the spare tire (14) is shown before an impact. This support is positioned axially compared to the circular band (36) so that the tire (14) protrudes slightly outside the external panel (28). When, as shown at the right side of FIG. 6, the vehicle suffers a rear impact exerted by another vehicle (86), the corresponding force (F) is applied to the tire (14) and causes the axial distortion of the support (54) from back to front.

Furthermore, the support (54) is initially positioned at a determined distance ($d_{54}$) from the internal body panel (24) so that the spare tire (14) can, at the end of the impact, recoil a distance at least equal to the determined distance ($d_{54}$) without distorting either the internal lining panel (24) or a sill (88) of the tailgate (12) of the vehicle.

This arrangement is particularly advantageous, since it makes it possible to reduce considerably the costs of repairing a damaged tailgate (12). In effect, as all the components of the tailgate (12) are anchored with screws (not shown) to allow removal and replacement of the components of the tailgate (12) independent of one another, it suffices to change the damaged components of the tailgate without replacing the tailgate in its entirety. Thus, according to increasing magnitudes of intensity of the impact, one may only have to replace the external panel (28) or the external panel (28) and the support (54), or the panel, (28), the support (54) and the internal panel (24), the frame (30) in all cases having great stiffness that allows it to be re-used after the impact.

Figure 7:
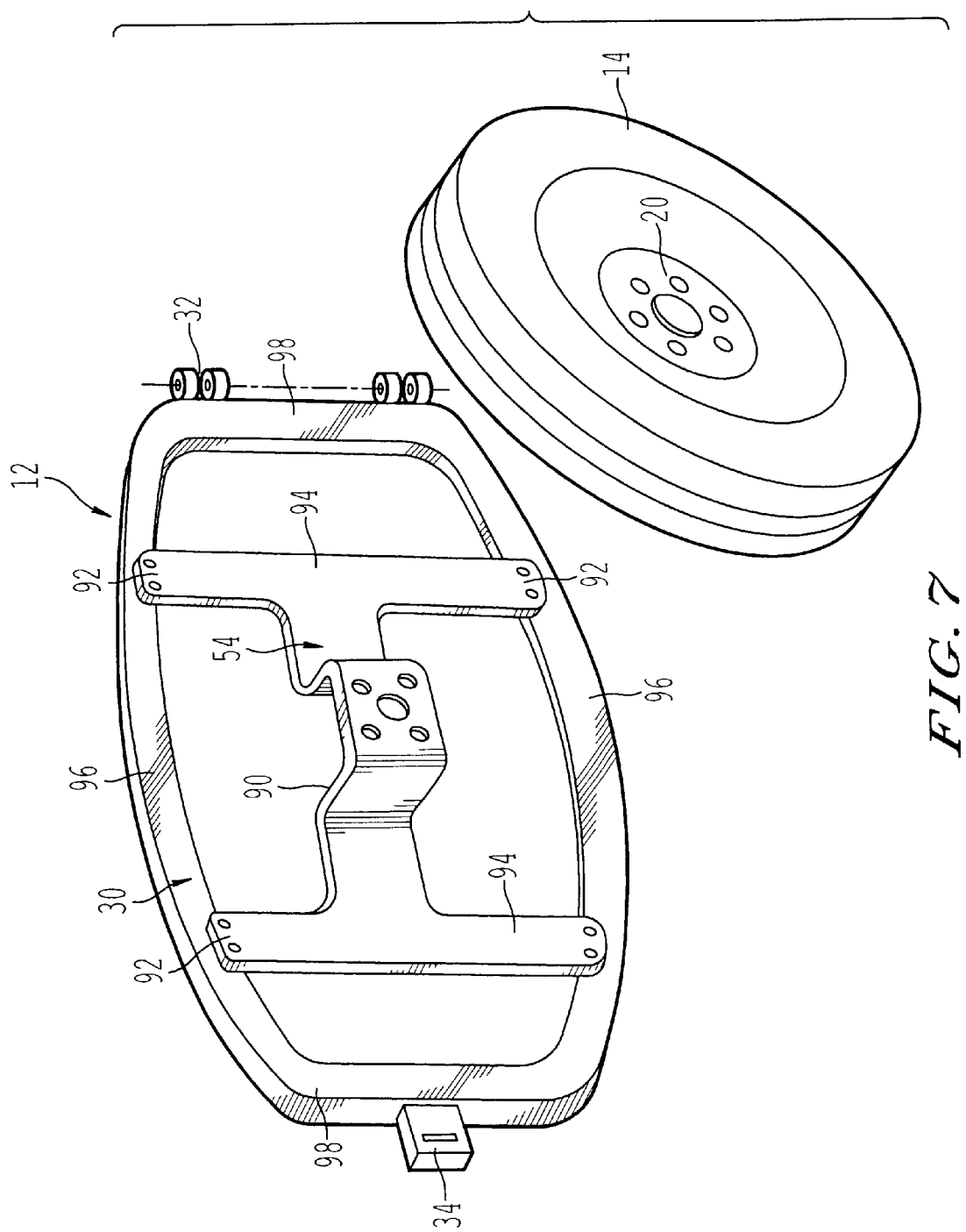
FIG. 7 is a perspective view of a frame of the tailgate comprising a bare support according to a third mode of embodiment.

Finally, according to a third mode of embodiment that is shown in FIG. 7, the support can be H-shaped, where the horizontal branch (90) receives the disk (20) of the spare tire (14) described previously, and the free extremities (92) of the vertical branches (94) are attached to the transversal branches (96) of a monoblock framework forming the frame (30) of the tailgate (12). In analogous fashion to the two modes of embodiment described previously, vertical branches (98) of the monoblock framework carry the hinge and locking mechanisms (32, 34) of the tailgate on the body shell structure.

In this mode of embodiment, the support (54) and the framework forming the frame (30) can be made of stamped steel or in the form of hydroformed tubes.

The invention therefore allows the production of a tailgate that contributes to the passive safety of the vehicle and that has a reduced repair cost.

It should be noted that the exemplary embodiments depicted and described herein set forth the preferred embodiments of the present invention, and are not meant to limit the scope of the claims hereto in any way.

Numerous modifications and variations of the present invention are possible in light of the above teachings. It is therefore to be understood that, within the scope of the appended claims, the invention may be practiced otherwise than as specifically described herein.

What is claimed is:

1. A spare tire support adapted to be carried by a tailgate for an automobile, wherein:
   the support is adapted to receive a disk of a spare tire;
   the support is positioned in a thickness of the tailgate between an internal lining panel facing toward a passenger compartment of the automobile and an external body panel; and
   the support is carried by an internal frame of the tailgate that carries a hinge mechanism and a locking mechanism of the tailgate on a body shell structure, and on which are attached the internal lining and external body panels.

2. The spare tire support according to claim 1, wherein the support is less stiff than the internal frame so that the support can be distorted without distorting the frame when the automobile suffers a rear impact.

3. The spare tire support according to claim 1, wherein the support comprises a C-shaped transversal member having extremities fixed to an inside edge of a central circular band of the frame, and a convex central part that is dished in order to be received within a rim of the spare tire, the convex central part having means for anchoring a disk of the spare tire.

4. The spare tire support according to claim 3, wherein the convex central part of the support is oriented towards the passenger compartment of the automobile.

5. The spare tire support according to claim 1, wherein the support is positioned at a determined distance from the internal lining panel so that the spare tire can recoil a determined distance during impact without deforming the internal lining panel and a sill of the tailgate of the automobile.

6. The spare tire support according to claim 1, wherein the support is H-shaped having a horizontal branch adapted to receive a disk of the spare tire, and vertical branches with free ends that are adapted to be fixed to transversal branches of a monoblock framework forming the frame.

7. A tailgate for an automobile, said tailgate comprising:
an internal frame having a support adapted to receive a spare tire, said frame having a locking mechanism and a hinge mechanism adapted to connect said tailgate to the automobile;
an internal lining panel mounted to an internal side of said frame that is oriented to face a passenger compartment of the automobile; and
an external body panel mounted to an external side of said frame that is oriented to face an exterior of the automobile,
wherein said tailgate is adapted to receive a spare tire such that the spare tire is positioned in a thickness between said internal lining panel and said external body panel.

8. A tailgate for an automobile, said tailgate comprising:
a frame having a support adapted to receive a spare tire, said frame having a locking mechanism and a hinge mechanism adapted to connect said tailgate to the automobile;
an internal lining panel mounted to an internal side of said frame that is oriented to face a passenger compartment of the automobile; and
an external body panel mounted to an external side of said frame that is oriented to face an exterior of the automobile,
wherein said tailgate is adapted to receive a spare tire such that the spare tire is positioned in a thickness between said internal lining panel and said external body panel, and
wherein said support is less stiff than a remaining portion of said frame whereby said support can distort without distorting said frame when the automobile suffers a rear impact.

9. A tailgate for an automobile, said tailgate comprising:
a frame having a support adapted to receive a spare tire, said frame having a locking mechanism and a hinge mechanism adapted to connect said tailgate to the automobile;
an internal lining panel mounted to an internal side of said frame that is oriented to face a passenger compartment of the automobile; and
an external body panel mounted to an external side of said frame that is oriented to face an exterior of the automobile,
wherein said tailgate is adapted to receive a spare tire such that the spare tire is positioned in a thickness between said internal lining panel and said external body panel, and
wherein said support is received in a central circular band of said frame, said band being adapted to have a diameter approximately equal to a diameter of the tire, said band having sides that are each attached to a transversal arm, a first transversal arm carries said hinge mechanism and a second transversal arm carries said locking mechanism.

10. The tailgate according to claim 9, wherein said first transversal arm and said second transversal arm are each formed of slender tubes joined to form a C-shape, wherein free ends of said first transversal arm and free ends of said second transversal arm are welded to said band, and a vertical central portion of said first transversal arm carries said hinge mechanism and a vertical central portion of said second transversal arm carries said locking mechanism.

11. The tailgate according to claim 9, wherein said support comprises a C-shaped transversal member having extremities fixed to an inside edge of said band, and a convex central part that is adapted to be received within a rim of the spare tire, said convex central part having means for anchoring a disk of the spare tire.

12. The tailgate according to claim 11, wherein said convex central part of said support is oriented towards the passenger compartment of the automobile.

13. The tailgate according to claim 12, wherein said internal lining panel comprises a circular access hatch that has a diameter adapted to be at least equal to a diameter of the spare tire.

14. The tailgate according to claim 11, wherein said convex central part of said support is oriented towards the exterior of the automobile.

15. The tailgate according to claim 14, wherein said internal lining panel comprises a circular access hatch that has a diameter adapted to be approximately equal to a diameter of a disk of the spare tire whereby the spare tire can be anchored to said support from within an interior of the automobile.

16. The tailgate according to claim 13, wherein said external body panel comprises at least one removable central part forming a cover for the spare tire, and wherein said at least one removable central part forming a cover for the spare tire is anchored to an additional skin of said external body panel.

17. The tailgate according to claim 15, wherein said external body panel comprises at least one removable central part forming a cover for the spare tire, and wherein said at least one removable central part forming a cover for the spare tire is anchored to a back of said convex central part of said support and is adjusted with an additional skin of said external body panel.

18. A tailgate for an automobile, said tailgate comprising:
a frame having a support adapted to receive a spare tire, said frame having a locking mechanism and a hinge mechanism adapted to connect said tailgate to the automobile;
an internal lining panel mounted to an internal side of said frame that is oriented to face a passenger compartment of the automobile; and
an external body panel mounted to an external side of said frame that is oriented to face an exterior of the automobile,
wherein said tailgate is adapted to receive a spare tire such that the spare tire is positioned in a thickness between said internal lining panel and said external body panel, and
wherein said external body panel comprises at least one removable central part forming a cover for the spare tire.

19. A tailgate for an automobile, said tailgate comprising:
a frame having a support adapted to receive a spare tire, said frame having a locking mechanism and a hinge mechanism adapted to connect said tailgate to the automobile;
an internal lining panel mounted to an internal side of said frame that is oriented to face a passenger compartment of the automobile; and
an external body panel mounted to an external side of said frame that is oriented to face an exterior of the automobile, wherein said tailgate is adapted to receive a spare tire such that the spare tire is positioned in a thickness between said internal lining panel and said external body panel, and wherein all components of said tailgate are anchored with screws to allow removal and replacement of said components independent of one another.

20. A tailgate for an automobile, said tailgate comprising:

a frame having a support adapted to receive a spare tire, said frame having a locking mechanism and a hinge mechanism adapted to connect said tailgate to the automobile;

an internal lining panel mounted to an internal side of said frame that is oriented to face a passenger compartment of the automobile; and an external body panel mounted to an external side of said frame that is oriented to face an exterior of the automobile, wherein said tailgate is adapted to receive a spare tire such that the spare tire is positioned in a thickness between said internal lining panel and said external body panel, and wherein said support is positioned at a determined distance from said internal lining panel so that the spare tire can recoil a determined distance during impact without deforming said internal lining panel and a sill of said tailgate.

* * * * *